3,737,428
MANUFACTURE OF UREA AND DERIVATIVES THEREOF

Shigeru Tsutsumi, Hirakata, and Noboru Sonoda, Osaka, Japan, assignors to Asahi Kasei Kogyo Kabushiki Kaisha, Osaka-shi, and Chiyoda Kako Kensetsu Kabushiki Kaisha, Kanagawa-ken, Japan
No Drawing. Filed Mar. 26, 1970, Ser. No. 23,040
Claims priority, application Japan, Mar. 28, 1969, 44/24,269
Int. Cl. C07c 127/02, 127/16, 127/20
U.S. Cl. 260—239.3 R     12 Claims

ABSTRACT OF THE DISCLOSURE

In manufacturing urea or a derivative thereof from ammonia or amine, the present process is characterized by reacting ammonia or amine with carbon monoxide in the presence of selenium.

---

This invention relates to a new and useful process for manufacturing urea and derivatives thereof.

It is well known in the art to produce urea by reacting ammonia with carbon dioxide under increased pressures of 120 to 400 atoms at elevated temperatures of 150 to 210° C. Such high pressures and temperatures applied, however, necessitate complicated procedures and large scale pressure apparatuses, reducing commercial advantages of the method. According to this method, moreover, ammonium carbamate which is highly corrosive to various materials is produced as an intermediate in the course of the reaction, so that specific materials resistant to such corrosive action as well as to high pressures and temperatures applied are required to the reaction apparatus.

It is also known that urea derivatives, such as dialkyl urea, diphenyl urea, etc., may be prepared by the reaction of amines with phosgene. According to the known method, however, it is difficult to obtain the desired urea derivatives at a high yield of more than 80 mole percent relative to the converted amines because of insufficient selectivity. The phosgene used as a starting material is not so inexpensive as carbon monoxide because the former is usually synthesized from the latter. In this method, moreover, it is required not only to use as an apparatus the materials resistant to hydrochloric acid produced as a byproduct but also to recover the produced hydrochloric acid.

One object of the invention is accordingly to provide a process for manufacturing urea and derivatives thereof whereby the abovementioned drawbacks of the conventional methods can be overcome.

Another object of the invention is to provide a process for manufacturing urea in which high pressures and temperatures as applied in the conventional method are not required.

Another object of the invention is to provide a process which makes it possible to produce urea under an atmospheric pressure at a yield higher than or similar to that in the conventional method in which high order of pressure is required.

Another object of the invention is to provide a process for manufacturing urea derivatives from amine and carbon monoxide at such a high yield as more than 80 mole percent relative to the converted amines.

A still further object of the invention is to provide a process for manufacturing urea and derivatives thereof with easy procedures and simple apparatuses free of the production of undesired corrosive byproduct, rendering the production of urea and its derivatives commercially advantageous.

The above and other objects of the invention will be apparent from the following description.

The process of the invention is characterized by reacting ammonia or amines with carbon monoxide in the presence of selenium to produce urea or derivatives thereof.

According to the researches of the present inventors it has been found that when ammonia or amine is reacted with carbon monoxide in the presence of selenium the reaction can proceed effectively to produce urea or its derivative in high selectivity and high yield free of the production of undesired byproducts. In fact urea and its derivatives can be obtained in a substantially theoretical amount according to the process of the invention. Particularly, urea can be obtained in a high yield under atmospheric pressures or moderately increased pressures and there is no need to apply high pressures as conventionally applied.

In the invention either liquid ammonia or ammonia gas can be used as ammonia source. The amines used in the invention include primary or secondary mono- or diamines. Employable monoamines are those having the formula of

wherein R and R' are hydrogen, alkyl of 1 to 15 carbon atoms, cycloalkyl of 5 to 8 carbon atoms, phenyl, alkyl-$(C_1-C_4)$-phenyl or phenyl-alkyl$(C_1-C_4)$. Employable as diamines are those having the formula of

wherein $n$ is an integer of 2 to 4.

From monoamines the corresponding urea derivatives can be obtained and from diamines can be obtained the corresponding cyclourea derivatives having the formula of

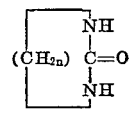

$n$ being the same as defined before.

Representative examples of monoamines are methyl amine, ethyl amine, propyl amine, butyl amine, hexyl amine, octyl amine, dodecyl amine, methylethyl amine, dimethyl amine, methylhexyl amine, aniline, benzyl amine, cyclohexyl amine, piperidine, etc. Examples of diamines are ethylene diamine, propylene diamine and butylene diamine. Of these amines preferable are aliphatic primary monoamines having the formula of R''—$NH_2$, R'' being alkyl of 1 to 12 carbon atoms such as methyl amine, ethyl amine, propyl amine, butyl amine, hexyl amine, octyl amine and dodecyl amine.

As carbon monoxide source either CO gas or CO-containing gas can be employed. Carbon monoxide is usually employed in a stoichiometric amount or in excess amount, preferably in 30 to 50% in excess amount, and unreacted carbon monoxide gas may be recycled, as required.

It is essential in the invention that the reaction be conducted in the presence of selenium, whereby the reaction between ammina or amine with carbon monoxide to produce urea or its derivative proceeds effectively without application of high pressure and temperature. Employable are metallic selenium, amorphous selenium and a compound capable of producing selenium under the reaction conditions applied, the most preferable being amorphous selenium. The mechanism in which selenium displays high order of catalytic effect has not been made clear, but it is supposed that selenium first reacts with carbon monoxide to produce carbonyl selenium SeCO and then the SeCO reacts with an amine to produce urea or its derivative. The reactions involved in the process of the invention are represented in the approximate equations as follows:

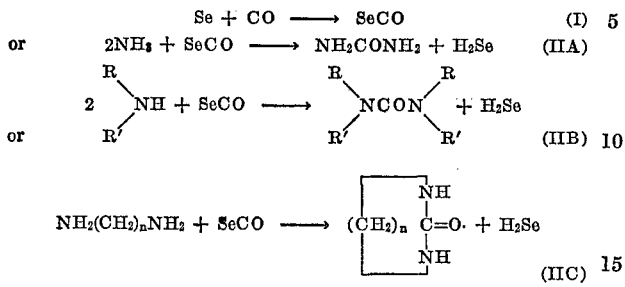

wherein R, R' and $n$ are the same as defined before.

The hydrogen selenide $H_2Se$ produced in every case above, (II-A), (II-B) or (II-C), is then reacted with oxygen present in the reaction system to regenerate selenium. The regeneration of selenium may be effected by the reaction of $H_2Se$ with oxygen which is naturally contained in the starting materials and in selenium and in solvent, if used, but it is preferable to positively introduce oxygen into the reaction system, whereby the reaction proceeds more effectively.

The amount of the selenium used may vary in accordance with whether or not oxygen is positively introduced into the reaction system. When oxygen is introduced the selenium is usually used in at least 0.001 g. eq., preferably 0.01 to 0.1 g. eq., per g. eq. of the starting ammonia or per amino group in the amine, and larger amount of selenium may be used without any adverse effect. In the case that oxygen is not positively introduced the selenium is usually used in 0.4 to 1.0 g. eq., preferably 0.7 to 0.9 g. eq., per g. eq. of the ammonia or per amino group in the amine, though larger amount may also be used with no adverse effect. When oxygen is positively introduced into the reaction system, it may be supplied continuously or intermittently in the form of oxygen gas, oxygen-containing gas, such as air or a compound, such as hydrogen peroxide, capable of producing oxygen under reaction conditions. The supply amount of oxygen may vary over a wide range, but it is preferable to feed it in the amount of 5 to 10% by volume, based on the volume of carbon monoxide used.

The reaction of the invention may be carried out in the presence or in the absence of solvents, but it is preferable to employ solvents since the use thereof ensures more homogeneous reaction with the increase of yield of the products. Employable are various solvents inert to the reaction but having solubility to the starting ammonia or amine used. Preferable examples of the solvents are water; methanol, ethanol, propanol, butanol and like aliphatic alcohols; acetone, methylethyl ketone, isobutyl ketone and like ketones; diethyl ether, dioxane, tetrahydrofurane and like ethers; benzene, cyclohexane, n-hexane and like hydrocarbons; dimethylformamide and like formamides; ethyl acetate and like esters; and triethylamine and like tertiaryamines.

According to the preferred method of the invention the reaction between ammonia and carbon monoxide may be carried out by introducing CO gas or CO-containing gas into liquid ammonia or ammonia water containing selenium therein or by introducing CO gas or CO-containing gas with ammonia gas into a solvent containing selenium. The reaction between amines and carbon monoxide may be carried out by introducing CO or CO-containing gas into amines or solution thereof containing selenium. Oxygen and carbon monoxide may be introduced to the reaction system simultaneously, but in accordance with one of the preferred embodiments of the invention carbon monoxide is first introduced to dissolve the selenium in the starting mixture and thereafter oxygen is supplied in combination with the carbon monoxide.

The reaction velocity tends to increase gradually in proportion to the increase of the pressure and temperature, but there is no need to apply pressure and/or heat to the reaction system, since the reaction proceeds effectively under atmospheric pressures at room temperatures. The reaction pressure is usually atmospheric pressure but many be increased to not higher than 50 kg./cm.², though higher pressure of not more than 100 kg./cm.² may be applicable, as required. The reaction temperature is usually room temperature but can vary over a wide range. When liquid ammonia is used as ammonia source, for example, the reaction may proceed at a boiling point of the liquid ammonia or lower, i.e. in the range of $-33$ to $-70°$ C., and elevated temperature as $200°$ C. may be applicable. Usually the reaction is carried out at a room temperature or a moderately elevated temperature of lower than $80°$ C.

The resultant product can be separated by introducing oxygen gas to the resultant reaction mixture to precipitate selenium and evaporating the unreacted amine and/or solvent.

The present reaction may be carried out in bath or in tinuous manner, and in the latter case the unreacted carbon monoxide and ammonia or amine may be recirculated.

For better understanding of the invention examples are given below:

EXAMPLE 1

To 100 ml. of tetrahydrofurane was added 4 g. of amorphous selenium. To the resultant liquid was blown a mixture of 0.1 mole of ammonia gas and 0.075 mole of carbon monoxide under atmospheric pressure at room temperature while being recirculated. After 5.5 hours of the reaction the supply of the above gas mixture was stopped and air was introduced into the reaction system to precipitate selenium. The precipitated selenium was removed by filtration and evaporation of the tetrahydrofurane from the residual liquid gave 2.8 g. (0.047 mole) of urea. The conversion of ammonia was 97 mole percent and the yield of urea relative to the reacted ammonia was 97 mole percent.

EXAMPLE 2

7.77 g. of n-butylamine was dissolved in 100 ml. of tetrahydrofuran, to which was added 400 mg. of amorphous selenium. Carbon monoxide was blown into the resultant liquid at 60 ml./min. for 5 minutes and thereafter carbon monoxide and air were blown in at 60 ml./min. and 9 ml./min. respectively. After 4 hours of the reaction the supply of carbon monoxide was stopped but the supply of the air was continued to precipitate selenium. By filtration the selenium was recovered and ethanol was evaporated, whereby 8.92 g. of 1,3-dibutyl urea having a melting point of $71°$ C. was obtained, which corresponded to 10.2 g. eq. per g. eq. of the selenium used. The conversion of the amine used was 100 mole percent and the yield of dibutyl urea in respect of the reacted amine was 98 mole percent.

EXAMPLE 3

In the same manner as in Example 2 except that 14.6 g. of n-butylamine and 79 mg. of amorphous selenium were used and the reaction was continued for 10 hours, 13.8 g. of 1,3-dibutyl urea having a melting point of $71°$ C. was obtained, which corresponded to 80 g. eq. per g. eq. of the selenium used. The conversion of amine was 85 mole percent and the yield of dibutylurea in respect of the reacted amine was 94 mole percent.

EXAMPLE 4

The reaction between n-butylamine and carbon monoxide was conducted in the same manner as in Example 2 except that 7.75 g. of n-butylamine was used and the reaction system was heated to $55°$ C. After 2.5 hours of the reaction 8.85 g. of 1,3-dibutyl urea having a melting point of $71°$ C. was obtained. The conversion of amine was 100 mole percent and the yield of dibutyl urea in respect of the reacted amine was 97 mole percent.

EXAMPLE 5

In a 200-ml. autoclave were placed 7.77 g. of n-butyl amine and 100 ml. of tetrahydrofuran, to which was added 400 mg. of amorphous selenium. Carbon monoxide was forced into the system so as to maintain the pressure in the autoclave at 40 kg./cm.$^2$ and the system was stirred for 5 minutes. Thereafter air was forced in to maintain the pressure in the autoclave at 44 kg./cm.$^2$ and the stirring was continued. After one hour of the reaction the gas in the autoclave was evacuated. By filtration precipitated selenium was recovered and removal of the tetrahydrofuran gave 8.92 g. of 1,3-dibutyl urea having a melting point of 71° C. The conversion of th eamine was 100 mole percent and the yield of dibutyl urea in respect of the reacted amine was 98 mole percent.

EXAMPLE 6

6 g. of benzyl amine was dissolved in 150 ml. of dioxane, to which was added 400 ml. of amorphous selenium. Into the resultant solution carbon monoxide and air were blown at 50° C. at the rates of 60 ml./min. and 7 ml./min. respectively. After 10 hours of the reaction the supply of carbon monoxide gas was stopped but the supply of air was continued to precipitate selenium. The precipitated selenium was recovered by filtration and unreacted amine and dioxane were evaporated to give 2.4 g. of 1,3-dibenzyl urea having a melting point of 169° C., which corresponded to 2 g. eq. per g. eq. of the selenium used, and the yield thereof in respect of the catalyst was 200%. The conversion of the amine was 24 mole percent and the yield of dibenzyl urea in respect of the reacted amine was 86 mole percent.

EXAMPLE 7

6 g. of cyclohexyl amine was dissolved in 120 ml. of methanol, to which was added 400 mg. of amorphous selenium. Into the resultant liquid carbon monoxide and air were blown at 50° C. at the rate of 60 ml./min. and 7 ml./min. respectively. After 8 hours of the reaction the supply of carbon monoxide was stopped but the supply of the air was continued to precipitate selenium. The precipitated selenium was recovered by filtration, and evaporation of the solution gave 1.7 g. of 1,3-dicyclohexyl urea having a melting point of 229° C., which corresponded to 1.50 g. eq. per g. eq. of the selenium used, and the yield thereof in respect of the catalyst was 150%. The conversion of the amine was 28 mole percent and the yield of the dicyclohexyl urea in respect of the reacted amine was 96 mole percent.

EXAMPLE 8

9.0 g. of piperidine was dissolved in 95 ml. of tetrahydrofuran, to which 400 mg. of selenium was added. Into the resultant liquid carbon monoxide was blown at 60 ml./min. for 30 minutes and thereafter carbon monoxide and oxygen were blown in at 60 ml./min. and 10 ml./min. respectively for 4 hours. After the reaction the supply of carbon monoxide was stopped but the supply of oxygen was continued to precipitate selenium. The precipitated selenium was recovered by filtration, and evaporation of the solution gave 2.52 g. of N,N,N′,N′-bis(pentamethylene) urea having a melting point of 42° C. The conversion of the amine was 26.5 mole percent and the yield in respect of the reacted amine was 90 mole percent.

EXAMPLE 9

In a 200-ml. autoclave were placed 5 g. of aniline, 40 ml. of triethylamine and 1.2 g. of amorphous selenium and the mixture was thoroughly stirred. Into the mixture carbon monoxide was blown at 60° C. so as to maintain the pressure in the autoclave at 20 kg./cm.$^2$ for 5 hours. After the reaction air was supplied to the system to precipitate the selenium and the selenium was recovered by filtration. Evaporation of the solution gave 2.0 g. of 1,3-diphenyl urea having a melting point of 238° C. The conversion of the amine was 40 mole percent and the yield in respect of the reacted amine was 87 mole percent.

EXAMPLE 10

In a 200-ml. autoclave were placed 50 ml. of ethanol, 3.6 g. of ethylene diamine and 2.4 g. of selenium and the mixture was thoroughly stirred. Into the resultant mixture carbon monoxide was blown at room temperature so as to maintain the pressure in the autoclave at 20 kg./cm.$^2$ for 2 hours. After the reaction air was supplied to the system to precipitate the selenium and the selenium was recovered by filtration. Evaporation of the solution gave 2.6 g. of N,N′-dimethylene urea having a melting point of 131° C. The conversion of amine was 99 mole percent and the yield in respect of reacted amine was 99 mole percent.

EXAMPLE 11

9.4 g. of n-dodecylamine was dissolved in 50 ml. of tetrahydrofuran, to which was added 400 mg. of amorphous selenium. Carbon monoxide was blown into the resultant liquid at 60 ml./min. for 10 minutes and thereafter carbon monoxide and air were blown at 60 ml./min. and 9 ml./min. respectively for 5 hours. After the reaction the supply of carbon monoxide was stopped but the supply of air was continued to precipitate selenium. The selenium was recovered and tetrahydrofuran was evaporated, whereby 9.7 g. of 1,3-di-n-dodecyl urea having a melting point of 105° C. was obtained, which corresponded to 10 g. eq. per g. eq. of selenium used. The conversion of the amine was 99 mole percent and yield in respect of the reacted amine was 96 mole percent.

EXAMPLE 12

7.3 g. of diethylamine was dissolved in 100 ml. of tetrahydrofuran, to which was added 400 mg. of selenium. Carbon monoxide was blown into the resultant liquid at 60 ml./min. for 15 minutes and thereafter carbon monoxide and oxygen were blown at 60 ml./min. and 10 ml./min. respectively for 4 hours. After the reaction the supply of carbon monoxide was stopped but the supply of oxygen was continued for 30 minutes. The precipitated selenium was recovered by filtration, and distillation of the residual liquid gave 2.3 g. of tetraethyl urea as a distillate boiling at 205 to 215° C., which corresponded to 2.67 g. eq. per g. eq. of the selenium used. The conversion of the amine was 34 mole percent and the yield in respect of the reacted amine was 81 mole percent.

EXAMPLE 13

In the same manner as in Example 2 except that 7.7 g. of isobutylamine was used in the place of n-butylamine, 8.8 g. of 1,3-di-isobutyl urea having a melting point of 128° C. was obtained, which corresponded to 10.1 g. eq. per g. eq. of the selenium used. The conversion of the amine was 99 mole percent and the yield in respect of the reacted amine was 98 mole percent.

What we claim is:

1. A process for manufacturing urea and a derivative thereof which comprises reacting one compound selected from the group consisting of ammonia and an amine with at least a stoichiometric amount of carbon monoxide in the presence of a catalytically effective amount of selenium; said amine being one species selected from the group consisting of (a) a monoamine having the formula of

wherein R and R′ are hydrogen, alkyl of 1 to 15 carbon atoms, cycloalkyl of 5 to 8 carbon atoms, phenyl, alkyl-($C_1$–$C_4$)-phenyl or phenyl-alkyl($C_1$–$C_4$), and
(b) a diamine having the formula of $$H_2N—(CH_2)_n—NH_2$$

wherein $n$ is an integer of 2 to 4.

2. The process for manufacturing urea according to claim 1 in which said compound to be reacted with carbon monoxide is ammonia.

3. The process for manufacturing urea according to claim 1 in which said compound to be reacted with carbon monoxide is ammonia and said reaction is carried out at an atmospheric pressure.

4. The process for manufacturing a derivative of urea according to claim 1 in which said compound to be reacted with carbon monoxide is a monoamine having the formula of $$\begin{array}{c} R \\ \diagdown \\ NH \\ \diagup \\ R' \end{array}$$

wherein R and R' are hydrogen, alkyl of 1 to 15 carbon atoms, cycloalkyl of 5 to 8 carbon atoms, phenyl, alkyl-($C_1$–$C_4$)-phenyl or phenyl-alkyl($C_1$–$C_4$).

5. The process for manufacturing a derivative of urea according to claim 4 in which said monoamine is an aliphatic primary monoamine having the formula of $$R''—NH_2,$$

wherein R'' is an alkyl of 1 to 12 carbon atoms.

6. The process for manufacturing a derivative of urea according to claim 1 in which said compound to be reacted with carbon monoxide is a diamine having the formula of $$H_2N—(CH_2)_n—NH_2$$

wherein $n$ is an integer of 2 to 4.

7. The process for manufacturing urea and a derivative thereof according to claim 1 in which said selenium is present in the reaction system in an amount of at least 0.4 g. eq. per g. eq. of the starting ammonia or per amino group in the starting amine without having oxygen positively introduced.

8. The process for manufacturing urea and a derivative thereof according to claim 7 in which said selenium is present in the reaction system in the range of 0.7 to 0.9 g. eq. per g. eq. of the starting ammonia or per amino group in the starting amine.

9. The process for manufacturing urea and a derivative thereof according to claim 1 in which said carbon monoxide is introduced into the reaction system in combination with oxygen.

10. The process for manufacturing urea and a derivative thereof according to claim 9 in which said oxygen source is oxygen gas, oxygen-containing gas or a compound capable or producing oxygen under the reaction condition.

11. The process for manufacturing urea and a derivative thereof according to claim 1 in which said carbon monoxide is introduced into the reaction system in combination with oxygen and said selenium is present in the reaction system in an amount of at least 0.001 g. eq. per g. eq. of the starting ammonia or per amino group in the starting amine.

12. The process for manufacturing urea and a derivative thereof according to claim 11 in which said selenium is present in the reaction system in the range of 0.01 to 0.1 g. eq. per g. eq. of the starting ammonia or per amino group in the starting amine.

References Cited
UNITED STATES PATENTS

| | | | |
|---|---|---|---|
| 2,857,430 | 10/1958 | Applegath et al. | 260—553 |
| 2,874,149 | 2/1959 | Applegath et al. | 260—553 |
| 2,957,910 | 10/1960 | Patterson | 260—553 |
| 2,966,516 | 12/1960 | Applegath et al. | 260—555 |
| 2,957,910 | 10/1960 | Patterson | 260—553 |
| 2,993,044 | 7/1961 | Applegath et al. | 260—553 |
| 3,277,061 | 10/1966 | Fenton | 260—553 |
| 3,316,297 | 4/1967 | Calderazzo | 260—553 |

FOREIGN PATENTS

| | | | |
|---|---|---|---|
| 1,135,889 | 9/1962 | Germany | 260—555 R |
| 1,162,828 | 2/1964 | Germany | 260—555 R |

OTHER REFERENCES
Jones "Inorganic Chemistry" (Blackiston) pp. 507–9 and 511–513.

HENRY R. JILES, Primary Examiner

R. T. BOND, Assistant Examiner

U.S. Cl. X.R.

260—251 R, 309.7, 553 R, 553 A, 553 C, 555 R, 293.69